Dec. 25, 1951   S. J. GARTNER ET AL   2,580,222
CONVEYER
Filed Nov. 9, 1946

INVENTORS
STANLEY J. GARTNER
BY AUGUST E. KULBERG

Lawrence Brown,
ATTORNEY

Patented Dec. 25, 1951

2,580,222

UNITED STATES PATENT OFFICE 2,580,222

CONVEYER

Stanley J. Gartner, Emporium, Pa., and August E. Kulberg, Beverly, Mass., assignors to Sylvania Electric Products Inc., Salem, Mass., a corporation of Massachusetts Application November 9, 1946, Serial No. 708,910

7 Claims. (Cl. 198—137)

This invention relates to conveyor devices and particularly to the type of conveyor wherein a plurality of article holding means are secured to links of a chain which constitutes the conveyor.

It is an object of the invention to improve the operation of the conveyor and provide for its use in highly accurate operations.

A further object of the invention is to provide a continuously controlled motion for a conveyor which passes over a sprocket for at least a portion of its travel.

A further object of the invention is to provide a link conveyor means particularly adapted for use on a machine for fabricating frangible objects.

A further object is to provide a link type conveyor which is rigidly guided in a straight path for a portion of its travel and then guided in a circular path.

Other objects and features will more fully appear from the following description in connection with the accompanying drawings in which Figure 1 is a plan view of a portion of a conveyor embodying the invention;

Figures 1, 2, 3:
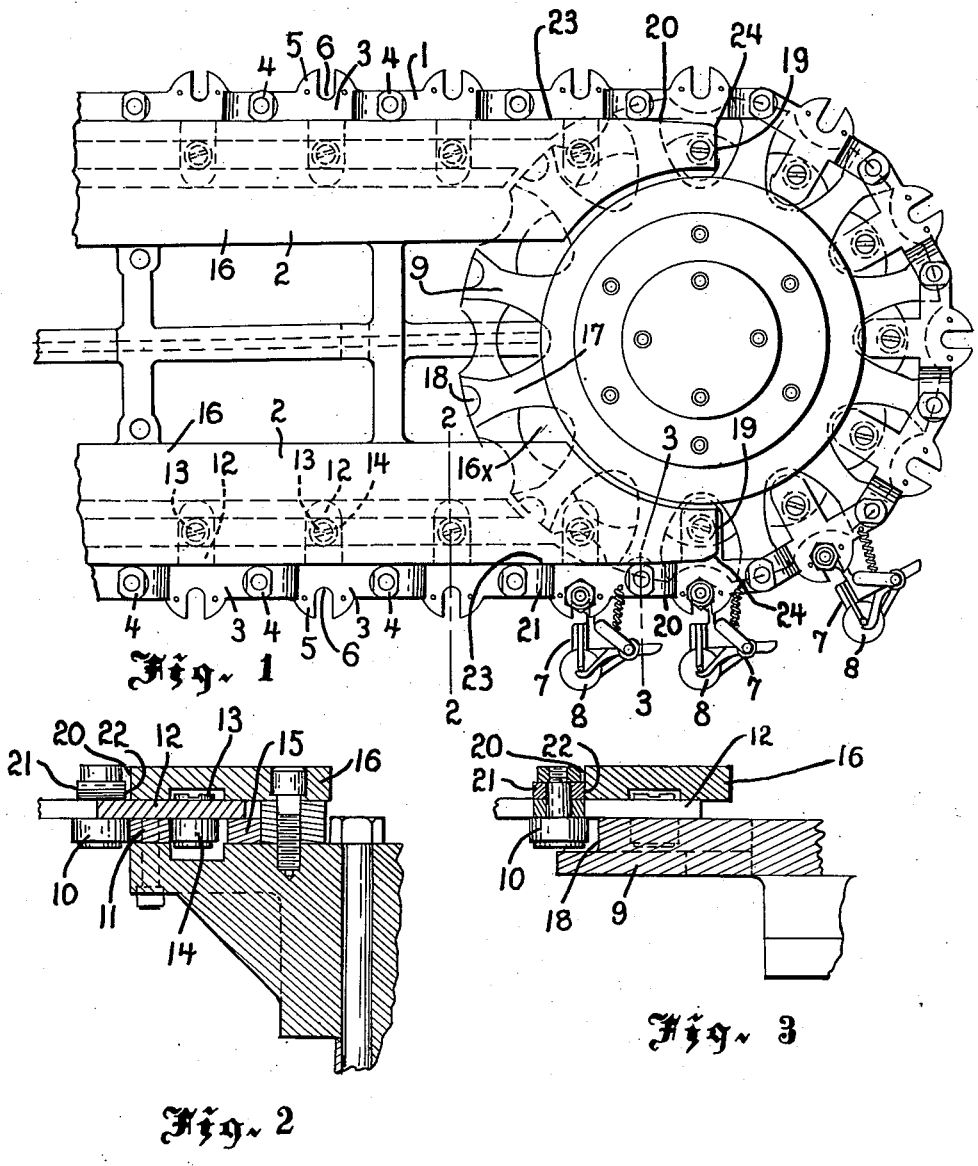
Figure 2 is a cross section on line 2—2 Figure 1.
Figure 3 is a cross section on line 3—3 Figure 1.

The invention may be applied to any link type conveyor apparatus wherein there is a change in the character of the motion of the conveyor holding devices for instance from linear to curved motion. The invention will herein be described in connection with a machine for fabricating stems for electric lamps or the like as described in a pending application Ser. No. 637,440 filed on December 27, 1945 in the names of Roland M. Gardner, Stanley J. Gartner, and Edwin W. Barrett for Automatic Lamp Stem Fabricating Apparatus.

The principles of the invention involve the manner in which a conveyor is guided during its passage from a relatively straight path to a curved path. The specific application of the inventive principles to be described herein relates to a conveyor chain such as that shown in the drawings in which the conveyor 1 is guided in a straight path along the guide rail system 2 mounted upon the frame of a machine such as that described in the pending application referred to hereinabove. The conveyor is made up of a plurality of links 3 pivoted together upon pivot pins 4.

Each link or at least some of the links are provided with means for detachably securing an article holding device thereto. This means for securing the holding devices may have any form suitable to the particular operation performed by the machine. The application of the invention herein disclosed provides a plurality of holding devices for transporting stem members for electric lamps or similar articles. To secure these holders each link is provided with a laterally extending lip 5 having a slot 6 therein within which are removably secured stem holding heads 7 having stems 8 held therein.

To provide for operations performed upon the stems from below, the holders extend a substantial distance outward from the conveyor chain and are so positioned that the stems desirably are held in position with their axis between the pivot pins and accurately in line along the straight portion of the conveyor.

The operation of the machine requires that the conveyor pass over a sprocket 9 and this changes the straight path of the stem to a circular path. With this change in motion it is desired that the path of the stems remain confined to a predetermined path at all points in their travel to permit of performing accurate operations on the stems.

In the portion of the path of the conveyor where it passes from straight line motion to the sprocket the links are free to move laterally unless special provision is made to confine them at that point. To adequately describe the manner in which the invention accomplishes complete control of the movement of the links the specific conveyor structure shown will now be described.

To positively guide the conveyor links their pivot pins extend downward and have pivoted thereon a pair of rolls 10 which engage the front face of a guide rail 11 rigidly secured to the machine frame. Each link is provided also with a lateral extension 12 having a stud 13 upon which is pivoted a roll 14 extending downward and engaging the back face of the rail 11. The three rolls thus act to guide the links in a positive and true path in a vertical plane determined by the guide rail 11.

The links are also guided in a flat horizontal plane by suitable means. As shown herein the top and bottom faces of the links are made flat and parallel. The bottom faces of the link extensions 12 engage and move along the top face of the rail 11 and also upon the top of another rail 15. The rail 15 is rigidly secured to the machine frame parallel to and spaced from the rail 11. A top rail 16 is secured in position above the link extensions and engages the top faces thereof. The positions of the top and bottom guide rails are so adjusted that the links are free to move lengthwise along the rails but are held closely against all lateral movement. The straight portion of the conveyor travel is thus positively confined to a predetermined path.

The sprocket 9 is provided with a plurality of recesses 10x arranged around its periphery within which are received the extensions 12 and rolls 14 of the links as the conveyor passes over the sprocket. Between the recesses the solid portions 17 are provided with semi-circular recesses 18 at the sprocket periphery. The recesses 18 are substantially the same diameter as the rolls 10 and are spaced a chordal distance apart equal to the distance between the centers of the pins 4. As the chain passes around the sprocket the rolls 10 enter the recesses 18 and thus accurately determine the position of the links while they traverse the sprocket. The articles held in the holders 7 are thus guided and held in a predetermined path around the sprocket.

It will be noted that as the conveyor passes from its straight run to the sprocket and also as it leaves the sprocket to again travel in a straight line there is a portion of travel wherein the links are not wholly supported by the various guiding members above described. The guide rail 11 is cut off at a point near the periphery of the sprocket and terminates at a point a substantial distance from the point of tangency with the periphery of the sprocket of the straight line defined by the axes of the articles being processed.

To devise an efficient and rugged conveyor of the type to which the invention is applied it is highly desirable that the links making up the conveyor be guided rigidly along a predetermined plane and then held equally rigidly during their travel along the sprocket. To do this the main guiding means for the links is of necessity positioned in the same plane as the plane of the sprocket. This construction necessitates that the guide rail 11 be positioned inside a line tangent to the periphery of the sprocket in which the recesses 18 are formed. Therefore, the rail 11 must terminate before it reaches the tangent point of the periphery of the sprocket.

Due to this construction at least one of the rolls 10 leaves the end of the rail 11 before it engages a recess 18. While this roll is travelling unsupported the links in front of and behind the roll were, prior to the present invention, permitted limited movement laterally inward. Thus precise control of the conveyor at this point was lost.

This looseness may be of substantial extent particularly when the conveyor chain is slightly loose. This lateral play may cause irregular operation of the machine or cause breakage of the stems or other articles being processed. Moreover, when such an inefficient condition exists the conveyor chain may become jammed as the links pass from the sprocket to again become guided by the companion rail 11 which guides the conveyor back to another sprocket or other device not shown which completes its endless cycle of operation.

The present invention overcomes this inefficient operation by providing the top guiding rail 16 which is situated above the plane of the rolls 10 and is thus capable of overlying a portion of the sprocket. This rail is extended over a portion of the sprocket 9 with its end face 19 lying in a plane substantially at right angles to the rails 11.

The front edge 20 of the rail 16 is utilized as a guide for the links during their transition from their linear motion to their curved path around the sprocket. At the junction of successive links a portion 21 of one link overlies its cooperating link. The portion 21 is above the general plane of the link body and lies in the plane of the upper rail 16. The inner face 22 of this portion 21 lies against or slightly spaced from the edge 20. The edge 22 desirably is finished smooth and flat and functions to guide the links in a predetermined path during their transitional period above described. The guiding action takes place when the links pass from a straight to a curved path and also from a curved path to a straight path, for example, in passing to and from the sprocket.

Referring to Figures 2 and 3, taken respectively on lines 2—2 and 3—3 of Figure 1, the action of the guiding face 20 will become apparent. In Figure 2 the rolls 10 and 14 are guiding the link along the rail 11. In Figure 3 however, the roll 10 has left the rail and is now located at the transition portion of its travel. Consequently it has not yet seated itself within the recess 18. However at this point the face 20 of the rail 16 is engaging or closely adjacent the portion 21 of the link and thus the coaction of the portion 21 and the face 20 serves to guide the link during its transitional period.

The face 20 of the rail 16 is angled inward toward the sprocket from a point approximately at 23 to its outer end as shown in Figure 1. The tip end of the rail is curved at 24. The shape of the end portion of the rail serves to properly guide the links and prevent jamming when they start to follow the curvature of the sprocket or return from its curved to its straight path.

The invention insures smooth and reliable operation of the conveyor under all conditions of operation. When the invention is applied to a machine for making lamp stems the conveyor is subjected to a considerable degree of heat which causes thermal expansion of certain elements which may adversely affect the tension or other operating conditions of the conveyor.

The positive guiding means provided by the invention counteracts all tendency for the conveyor to deviate from its predetermined path or become locked or jammed against closely adjacent machine elements.

What we claim is:

1. A conveyor mechanism comprising a plurality of pivoted links, a frame upon which the links are supported, a stationary guide rail on the frame acting to positively guide the links in a substantially straight path, a curved guideway spaced from the stationary guide rail and movable with the conveyor, means on said links coacting with said stationary guide rail and said curved guideway to cause the links to follow a predetermined path, an intermediate guide means between the stationary guide rail and the curved guideway, and separate means secured to said links coacting only with the said intermediate guide means to guide the links while traveling between the stationary guide rail and the curved guideway.

2. A conveyor mechanism comprising a plurality of pivotally connected links, a frame, a stationary guide rail lying in a pre-determined plane on said frame to guide the links in a substantially straight path, a curved guideway movable with the links and disposed in the same plane as said stationary guide rail, said stationary guide rail and said curved guideway having portions within a line tangent to the outside peripheral curve of said movable guideway, and an auxiliary guiding means outside of the horizontal plane of the stationary guide rail and the curved guideway including guide follower means projecting from and movable with said links, said auxiliary guiding means acting independently of the stationary guide rail and the curved guideway upon the links while they pass to and from the said curved guideway.

3. A conveyor mechanism comprising a plurality of pivotally connected links, a frame, a stationary substantially straight guide rail lying in a pre-determined plane on said frame acting to positively guide the links in a predetermined path, a sprocket for guiding the links in a curved path disposed in the same plane as said straight guide rail and so disposed with respect to the straight guide rail that the pivot points of the links become disengaged from both the straight guide rail and the sprocket for a short transitory period, and guiding means engaging a portion of the links apart from the portion engaged by the straight guide rail and the sprocket during the said transitory period.

4. A conveyor mechanism comprising a plurality of pivotally connected links, a frame, a substantially straight guide rail lying in a predetermined plane on the frame, rolls on the pivots of said links engaging the front edge of said rail to guide the links, a sprocket rotatably mounted on said frame situated in the plane of said rail and with the plane of the front edge of said rail inside of a line tangent to the periphery of the sprocket, said sprocket having recesses in the periphery thereof to receive said rolls while the links are passing over the sprocket, and guiding means including projections secured to and movable with said links acting to guide the links when passing between the guide rail and the sprocket.

5. A conveyor mechanism comprising a plurality of pivotally connected links, a frame, a substantially straight guide rail lying in a pre-determined plane fixed on said frame, rolls on the pivots of said links engaging the front edge of said rail to guide the links, a sprocket rotatably mounted on said frame and in the plane of said rail and with the plane of its front edge inside of a line tangent to the periphery of said sprocket, said sprocket having recesses in the periphery thereof to receive said rolls while the links are passing over the sprocket, a top guide plate engaging the top faces of the links thereby to maintain alignment of the links, said top plate being out of the plane of the sprocket, an extension of said plate overlying the sprocket, and means on the links extending into the plane of said top plate extension and coacting therewith to guide the links when the links pass between the guide rail and the sprocket.

6. A conveyor apparatus including a conveyor chain having a plurality of links pivoted together, supports on at least some of the links for securing an object carrier thereon, a guide rail to guide the links in a straight line, a sprocket adjacent said guide rail for guiding the chain in a curved path, said sprocket being at least partly in a common flat plane with said guide rail and spaced therefrom whereby the link pivot points are caused to leave the guide rail before they engage the sprocket, link stabilizing means intermediate said guide rail and sprocket situated outside the common plane thereof, projections secured to at least some of said links extending into the plane of said link stabilizing means and coacting therewith to guide the links during their transfer to or from one or the other of the guide rail or the sprocket.

7. A conveyor apparatus including a conveyor chain having a plurality of links pivoted together, object carriers fixedly attached to said links and extending laterally therefrom, at least one guide rail positively to guide the links in a straight line, a sprocket adjacent the guide rail and spaced therefrom, said sprocket having its flatwise plane substantially coinciding with the plane of the guide rail and over which the links are guided in a positive curved path, link stabilizing means situated out of the plane of the links and intermediate said guide rail and the point of tangency of the outer edge of said guide rail with said sprocket, and projections secured to and moving with said links coacting with the said link stabilizing means to guide the links in a predetermined path during their transfer to or from said guide rail and said sprocket.

STANLEY J. GARTNER.
AUGUST E. KULBERG.

REFERENCES CITED

The following references are of record in the file of this patent:

UNITED STATES PATENTS

| Number | Name | Date |
| --- | --- | --- |
| 975,721 | Russell | Nov. 15, 1910 |
| 1,054,305 | Mueller | Feb. 25, 1913 |
| 2,338,962 | Olson | Jan. 11, 1944 |